(12) United States Patent
Peting (10) Patent No.: US 11,996,774 B2
(45) Date of Patent: May 28, 2024

(54) SYSTEM AND METHOD FOR ZERO VOLTAGE SWITCHING AND SWITCH CAPACITOR MODULATION

(71) Applicant: NEOFOCAL SYSTEMS, INC., Incline Village, NV (US)

(72) Inventor: Mark Peting, Yamhill, OR (US)

(73) Assignee: NEOFOCAL SYSTEMS, INC., Incline Village, NV (US)

( * ) Notice: Subject to any disclaimer, the term of this patent is extended or adjusted under 35 U.S.C. 154(b) by 148 days.

(21) Appl. No.: 17/458,015

(22) Filed: Aug. 26, 2021

(65) Prior Publication Data

US 2021/0391793 A1 Dec. 16, 2021

Related U.S. Application Data

(62) Division of application No. 15/433,865, filed on Feb. 15, 2017, now abandoned.

(Continued)

(51) Int. Cl.
*H02M 3/158* (2006.01)
*H02M 1/14* (2006.01)
*H05B 45/3725* (2020.01)

(52) U.S. Cl.
CPC .......... *H02M 3/158* (2013.01); *H02M 1/143* (2013.01); *H02M 3/1584* (2013.01); *H05B 45/3725* (2020.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584;

(Continued)

(56) References Cited

U.S. PATENT DOCUMENTS

6,989,997 B2 * 1/2006 Xu ................. H02M 3/158
363/16
7,782,027 B2 8/2010 Williams
(Continued)

*Primary Examiner* — Jeffrey A Gblende
(74) *Attorney, Agent, or Firm* — Miller Nash LLP (57) ABSTRACT

A driver circuit for driving a single conductor line that is coupled to a series of individually controlled circuit units each including a capacitor includes a power supply circuit for supplying a constant current to the single conductor line and a line driver supply circuit configured to modulate a digital information signal onto the constant current on the single conductor line. The line driver further includes a signaling transistor structured to operate in a zero voltage switched mode at least part of the time, and a signaling inductor coupled between the single conductor line and the signaling transistor.

11 Claims, 5 Drawing Sheets

Related U.S. Application Data

(60) Provisional application No. 62/267,852, filed on Dec. 15, 2015.

(58) Field of Classification Search
CPC ....... H02M 2003/1557; H02M 1/0032; H02M 1/4225; H02M 7/217; H02M 1/0025; H02M 1/0045; H05B 39/048; B23K 11/24; H04B 2215/069
See application file for complete search history.

(56) References Cited

U.S. PATENT DOCUMENTS

| | | | |
|---|---|---|---|
| 7,859,131 B2 * | 12/2010 | Xu | H02M 3/156 |
| | | | 307/11 |
| 8,823,281 B2 * | 9/2014 | Peting | H05B 47/185 |
| | | | 315/307 |
| 8,890,434 B2 * | 11/2014 | Peting | H05B 45/37 |
| | | | 315/246 |
| 9,578,701 B1 | 2/2017 | Logiudice et al. | |
| 9,934,191 B2 * | 4/2018 | Peting | G06F 13/4068 |
| 10,230,302 B2 * | 3/2019 | Petersen | H02M 3/07 |
| 2008/0074061 A1 | 3/2008 | Chen et al. | |
| 2014/0021879 A1 | 1/2014 | Yu et al. | |
| 2014/0184189 A1 | 7/2014 | Salem | |
| 2014/0333269 A1 * | 11/2014 | Peting | H02M 3/155 |
| | | | 323/222 |
| 2016/0197552 A1 | 7/2016 | Giuliano | |

* cited by examiner

SYSTEM AND METHOD FOR ZERO VOLTAGE SWITCHING AND SWITCH CAPACITOR MODULATION

CROSS REFERENCE TO RELATED APPLICATION

This application is a divisional of U.S. non-provisional patent application Ser. No. 15/433,865, filed Feb. 15, 2017, titled "SYSTEM AND METHOD FOR ZERO VOLTAGE SWITCHING AND SWITCH CAPACITOR MODULATION," which is a non-provisional of and claims benefit from U.S. Provisional Application No. 62/267,852 filed Dec. 15, 2015, titled "SYSTEM AND METHOD FOR ZERO VOLTAGE SWITCHING AND SWITCH CAPACITOR MODULATION," the disclosures of both of which are incorporated herein by reference in their entirety.

TECHNICAL FIELD

The disclosure relates to the field of electronic circuits for driving modulated direct current. In particular, but not by way of limitation, the discussion discloses techniques for modulating direct current with zero voltage switching and switched capacitor modulation.

BACKGROUND

Direct current (DC) loops are a type of electronic circuitry that provides certain advantages for many applications. Most digital electronic circuits operate with direct current circuits. With a modulated direct current loop, many independent individual direct current circuits can be supported. However, the field of electronic circuitry for generating modulated direct current loops is rather limited. Thus, it would be desirable to develop new and improved electronic circuitry for generating modulated direct current loops.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE EMBODIMENTS

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention example, although the example embodiments are mainly disclosed with reference to a system that efficiently transmits energy and control information to control Light Emitting Diodes (LEDs), the teachings of this disclosure can be used in any current loop circuit system. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
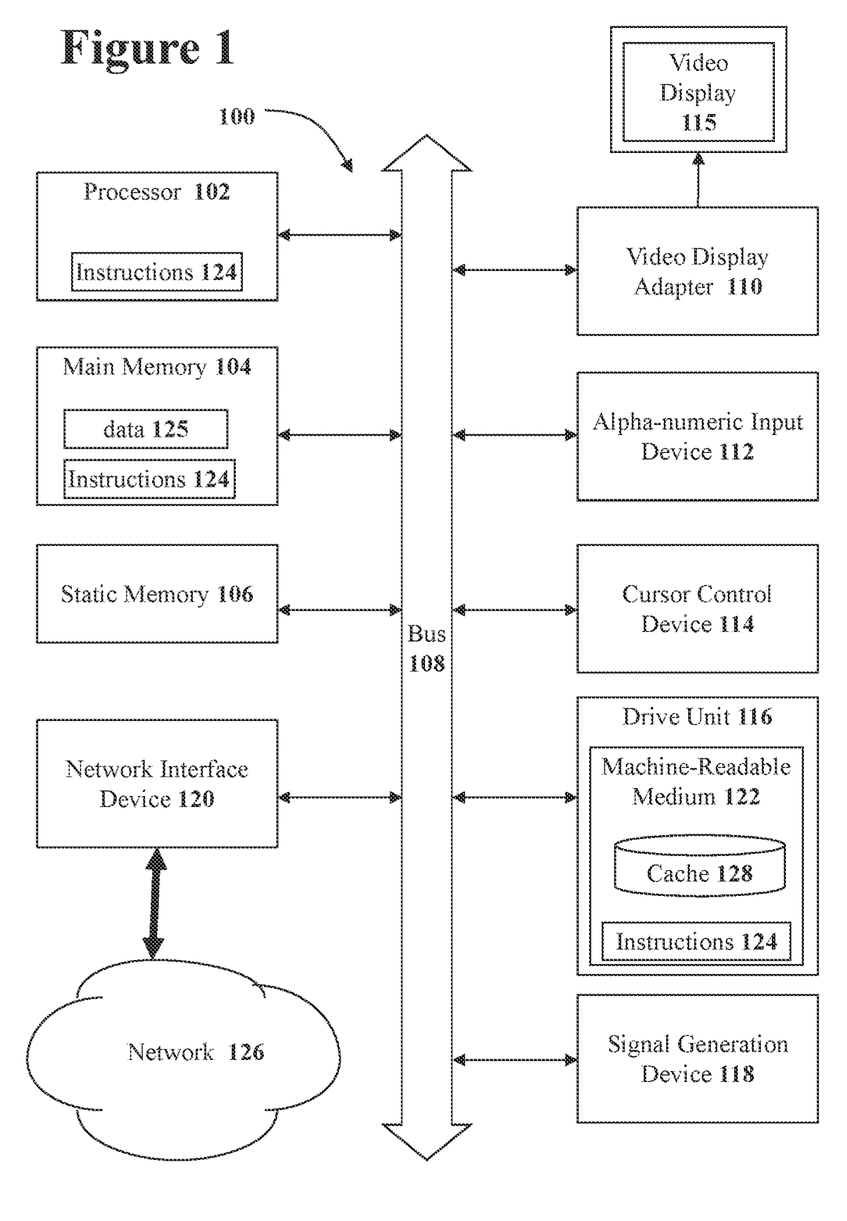
FIG. 1 illustrates a diagrammatic representation of a machine in the example form of a computer system within which a set of instructions, for causing the machine to perform any one or more of the methodologies discussed herein, may be executed.

The present disclosure concerns computer systems since computer systems are generally used to control LED lighting and display systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, an output signal generation device 118, and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1.

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module array be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALLY), a control unit, a memory system, and an input and output system (collectively termed I/O).

Microcontrollers are very small and inexpensive integrated circuits that are very often used in digital electronic devices, Multiple-Node Power and Control System Overview To power and control multiple circuit nodes, a single-wire direct current loop control system may be used. Specifically, individually circuit nodes are arranged in a series configuration that is driven by a head-end control unit located at the head of the series. The series of separate individually controlled circuit nodes may be referred to as a "line" or "string" of nodes devices. The head-end control unit for the string of nodes may be referred to as the "line driver" or "string driver" since the head-end control unit provides the electrical power and control signals that drive all of the individually controlled circuit nodes on the line or string.

Although the present disclosure will be disclosed with circuit nodes for driving Light Emitting Diodes (LEDs), the teachings of the present disclosure may be used to control circuit nodes driving any other type of electronic circuits such as sound systems, motors, sensors, cameras, Liquid Crystal Displays (LCDs), etc.

Figure 2:
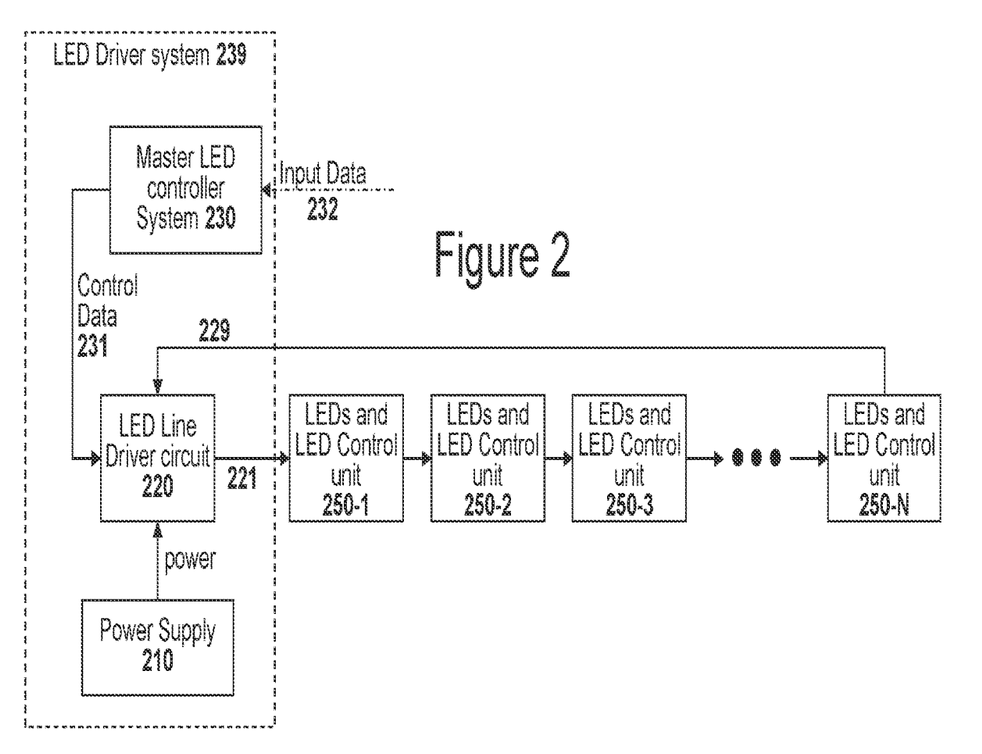
FIG. 2 illustrates a block diagram of the overall architecture of a single-wire multiple-node direct current loop control system.

FIG. 2 illustrates a block diagram of the overall architecture of the single-wire direct current loop control system that drives several circuit node units (250-1 to 250-N).

Specifically, a line driver circuit 220 is situated at the head of a series of individually controlled circuit node units (250-1 to 250-N). In the particular embodiment of FIG. 2, each of the individually controlled circuit node units (250-1 to 250-N) are used to drive Light Emitting Diodes (LEDs). Since this specific application is for driving LEDs, the line driver circuit 220 is referred to as the LED line driver circuit 220. But as stated earlier, the line driver circuit 220 can be used to drive any other type of electrical circuit.

In the embodiment of FIG. 2, the LED line driver circuit 220 receives electrical power from an external power supply circuit 210. The LED line driver circuit 220 also receives LED control data from a master LED controller system 230. The master LED controller system 230 provides detailed control data describing how the various LEDs on the individually controlled LED units (250-1 to 250-N) on the string should be powered on or off and the brightness of each powered on LED. The master LED controller system 230 can be any type of digital electronic system that provides LED control data in the appropriate format to the LED line driver circuit 220.

The master LED controller system 230 may range from a simple single chip microcontroller to a sophisticated computer system that drives many different LED strings in a coordinated manner. For example, in a relatively simple embodiment, the circuit components of a microcontroller-implemented master LED controller system 230, the power supply 210, and the LED line driver 220 may be combined into a single small LED Driver System 239 that controls an entire long string of LED units 250. In a more sophisticated embodiment, an external computer system, such as computer system 100 illustrated in FIG. 1, can be programmed to output appropriate LED control data signals 231 to the LED line driver circuit 220 using signal generation device 118 or any other appropriate data output system.

Using the power received from the power supply 210 and the LED control data 231 from the master LED controller system 230, the LED line driver circuit 220 drives an electrical signal on a current loop made up of line starting at 221 and returning at 229. The current loop may provide both electrical power and control data to the entire string of the individually controlled LED node units (250-1 to 250-N). This system of providing both power and control data on a single conductor simplifies the design and construction of LED lighting and display systems. Furthermore, the use of a single conductor to carry both power and control data significantly reduces the cost of constructing such a multiple LED display or lighting system.

Referring back to FIG. 2, a number of individually controlled LED node units (250-1 to 250-N) are coupled to the driver line (that starts at 221 and returns at 229) of the LED line driver circuit 220 in a series arrangement. Each individually controlled LED unit 250 may comprises one or more Light Emitting Diodes (LEDs), a LED controller circuit for driving the LEDs, and any additional components needed to complete the individually controlled LED node unit 250. In one embodiment, the only additional electrical component needed to complete the LED node unit 250 is a capacitor. The capacitor stores a local reservoir of energy for powering the local LED controller circuit and driving the LEDs on the individually controlled LED node unit 250.

In one embodiment, the LED line driver circuit 220 and the associated power supply 210 functions as an electrical current source that drives a nominally constant direct current (DC) signal on the single driver line 221 in order to provide power to the series of individually controlled LED node units 250. Each of the individually controlled LED node units (250-1 to 250-N) that are coupled to the driver line 221 in a series arrangement will draw needed operating power from the nominally constant current driven on the driver line. As set forth in the previous paragraph, each LED node unit 250 may store electrical energy in a local capacitor that can be used as a local power source.

To provide LED control data to all of the individually controlled LED node units 250 on the string, the LED line driver circuit 220 may modulate control data onto the electrical direct current driven on the driver line 221. In one embodiment, the control data is modulated onto the electrical current by encoding small up and down deviations from a nominal constant current value.

Various modulation encoding systems may be used. In one embodiment each data phase may be broken up into 2 cycles comprising either a positive spike of current followed by a negative spike of current or a negative current spike followed by a positive current spike. These two different data phase patterns are used to represent a one ("1") or a zero ("0") for a digital communication system.

Figure 3:
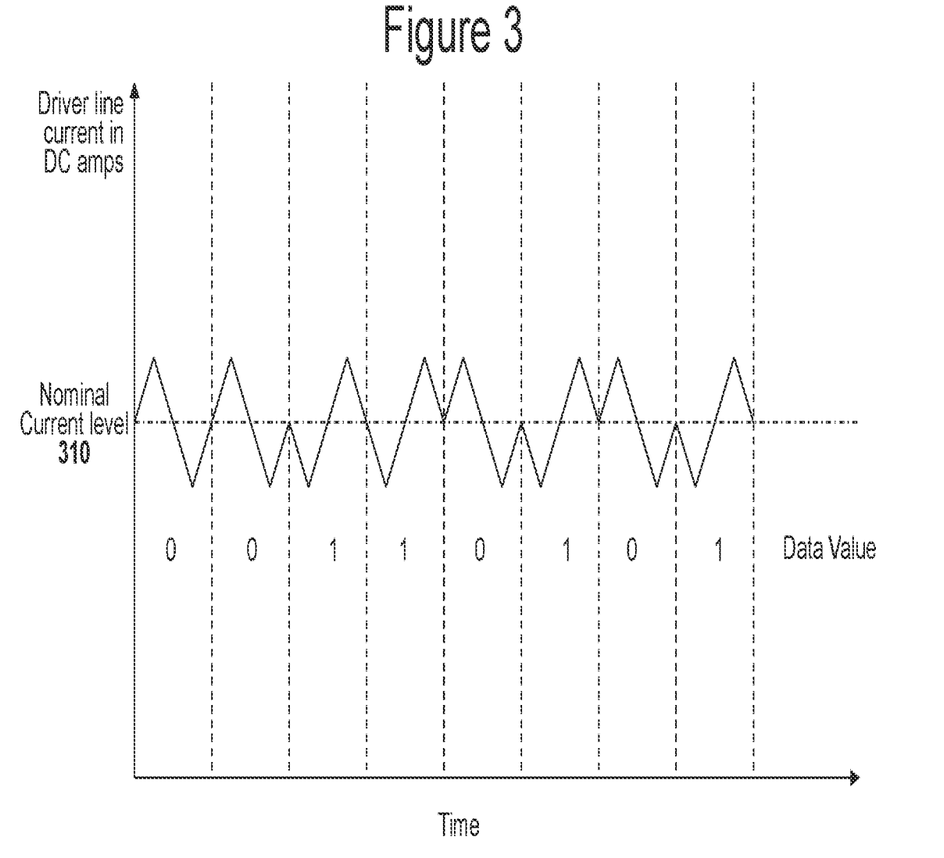
FIG. 3 illustrates a timing diagram that shows show digital information may be modulated as current deviations from a nominal current value.

FIG. 3 illustrates an example current diagram graphically depicting the current on the single driver line controlled by the LED line driver circuit 220 as data is modulated onto a nominal electrical current level 310. In the example of FIG. 3, a logical zero ("0") is represented by a positive spike of current followed by a negative spike of current and a logical one ("1") is represented by a negative current spike followed by a positive current spike. Note that each data phase contains both a positive current spike and a negative current spike such that average current value on the line remains at a constant nominal current amount specified by nominal current level 310. Note that many other current modulation systems may be used in other embodiments.

Standard Modulation

The standard modulator used in the system of FIG. 2 uses a single inductor to provide signaling and power to a number of series connected loads (LED node units 250-1 to 250-N). In order to have the ability to ramp the current on the inductor for communication purposes, the swing of the drive voltage to the inductor needs to be about three time that of the range of voltages presented by the series connected loads. Additionally the inductor needs to carry the full load direct current (DC) of the series connected loads. This combination of large voltage swing, higher direct current, and direct current bias causes significant losses in the transistor that drives the inductor for modulation, and in the inductor itself. A design that reduces the voltage swing into the inductor and reduces DC current and DC bias would be desirable to reduce losses in the drive system.

ZVS and Switched Capacitor Modulation

Figure 4:
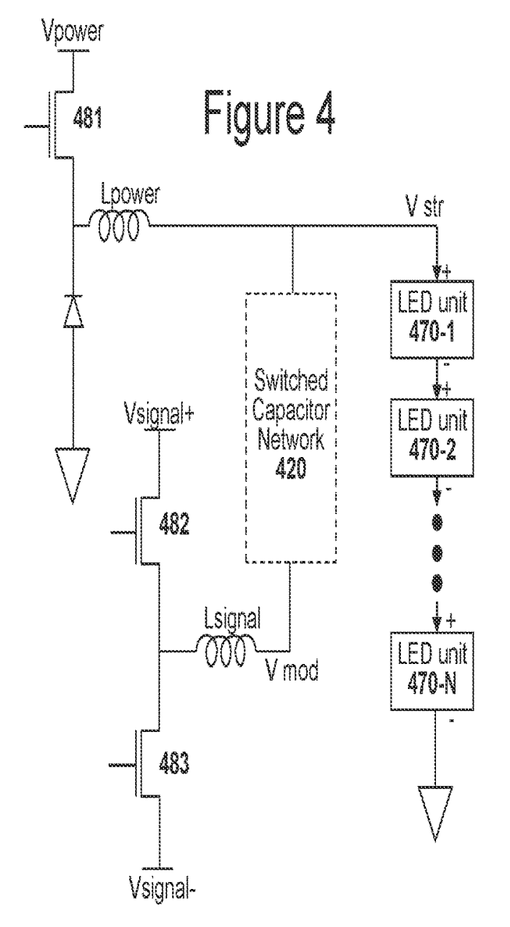
FIG. 4 illustrates a direct current driver circuit that may include a switched capacitor network.

One of reducing the voltage swing into the inductor and reducing the DC current is to separate the power and signaling paths. FIG. 4 illustrates a direct current driver circuit that includes a "switched capacitor network" 420. If one removes the switched capacitor network 420, sets Vsignal+ to two times (2X) Vpower, and sets Vsignal-to-Vpower, then this creates a driver circuit system with some advantages. Because the current in the Lsignal inductor averages about 0, the two transistors 482 and 483 are partially Zero Voltage Switched (ZVS).

Furthermore, since the current in that path is a small fraction of the current in Lpower, they can be higher resistance but lower capacitance transistors thus also improving the situation by reducing losses.

The direct current driver circuit of FIG. 4 does have a few drawbacks. For example, there is extra energy loss of two inductors (LPower and LSignal), the extra energy loss of additional transistors, and the extra complexity of the direct current driver circuit. Also the high voltage that the transistors 482 and 483 node must swing, combined with the low current, prevent effective Zero Voltage Switching (ZVS) with low cost electrical components. Thus, although the direct current driver circuit of FIG. 4 without the switched capacitor network 420 reduces energy loss, the direct current driver circuit could be improved further.

However, if FIG. 4 is implemented with the switched capacitor network 420 then energy loss can be significantly reduced. The direct current driver circuit mentioned in the previous two paragraphs required the voltage across transistors 482 and 483 to be three times (3×) the voltage swing in the load in order to keep enough voltage across Lsignal for modulation for any load voltage. However the voltage across the load only changes at one point in each bit transmission period, after which the voltage across the load is fairly constant. So if the switched capacitor network 420 is changed each bit time to shift the voltage into a narrower range, the voltage across transistors 482 and 483 can be reduced to three times (3x) that narrower range thereby lowering energy losses. Since the current across Lsignal can average near 0 Amps, the capacitors in the switched capacitor network 420 won't change voltage during a cycle. Any small voltage changes on the capacitors caused by imbalance or leakage can be offset by one or more of several approaches that can be used in some combination. These approaches include:

1) Adjust modulation to provide a net charge to capacitors and limit capacitor voltage with a voltage limit device, such as a Zener diode.
2) Have more capacitors than strictly needed for a 2n power series and then select capacitors to include both by the voltage required and to maintain voltages. To do this, on some cycles provide a net discharge and preferentially select capacitors to include those with higher than nominal voltage, on other cycles provide a net charge and select capacitors at lower than nominal voltage. Since the additional capacitors allow multiple combinations to reach a total voltage, this provides the control to keep all capacitors at near nominal voltage.
3) Leak a small current from the supply into the capacitors to charge the capacitors.
4) Have additional switches to connect and equalize capacitors.

Figure 5A:
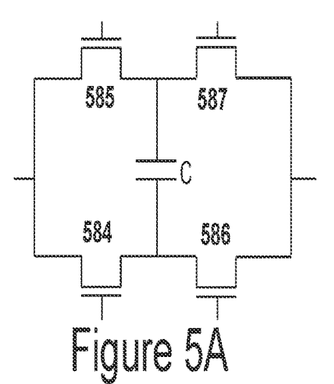
FIG. 5A illustrates a first embodiment of a switched capacitor network.
Figure 5B:
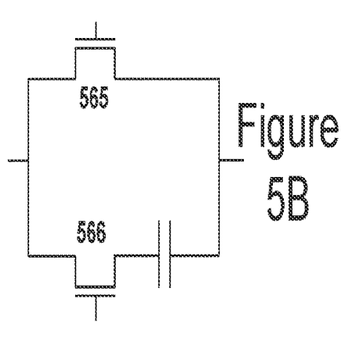
FIG. 5B illustrates a second embodiment of a switched capacitor network.
Figure 5C:
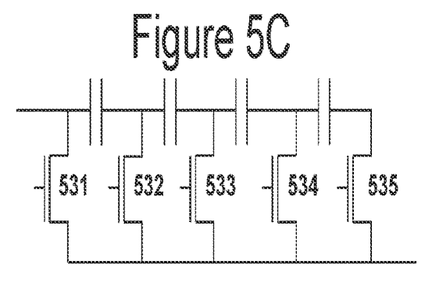
FIG. 5C illustrates a first embodiment of a switched capacitor network.

FIGS. 5A, 5B, and 5C illustrate three versions of switched capacitor networks that can be used as the switched capacitor network 420 of FIG. 4. Note that the switched capacitor networks of FIGS. 5A, 5B, and 5C can be used in combination by placing them in series or using a network in place of the capacitor in another network to produce other variations. Many additional other combinations not shown are also possible.

During operation, near the beginning of each bit time, the voltage of the series connected load is sensed by the control system and an appropriate set of switches are changed to use the capacitors to offset Vmod from Vstr so that the voltage is in the range of voltages that allow modulation to be driven from transistors 482 and 483 through Lsignal.

Since the voltage across transistors 482 and 483 is lower, energy loss in transistors 482 and 483 and Lsignal are all reduced. Thus transistors 482 and 483 can operate in a more Zero Voltage Switching (ZVS) manner since the decreased capacitance of transistors 482 and 483 (due to lower voltage rating) along with the decreased current of Lsignal speeds up the swing of the transistors 482 and 483 node during switching. Furthermore, the energy loss in transistors 482 and 483 during the non-Zero Voltage Switching (TVS) portion is also reduced because of the lowered voltage swing. Additionally the lower inductance and voltage swing of Lsignal lowers inductor losses.

There may be some switching losses on the transistor switches that change the switched capacitor network 420, but these losses can be low due to the lower voltage since each capacitor may only deal with a portion of the total voltage swing. Additionally some forms of the capacitor network allow some of the transistor switches to be opened at the time of voltage change and then current flowing into the Lsignal inductor can charge the transistor switches partly or completely which causes the switching energy to be stored into Lsignal and be recycled during the next modulation period. Also switching devices can be lower capacitance but higher resistance devices, since the lower current of just the modulation waveform will reduce $IR^2$ energy losses on the devices.

Figure 6:
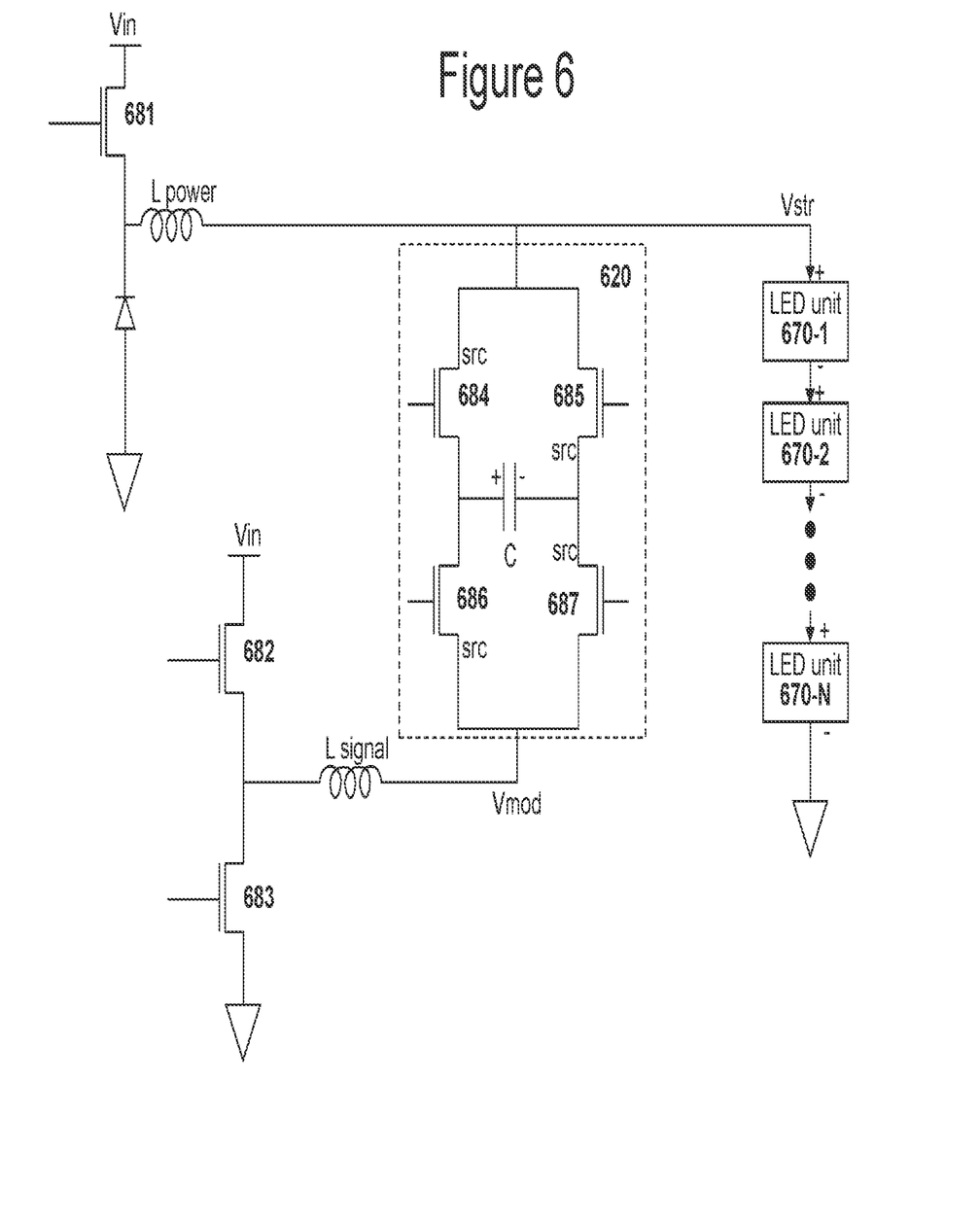
FIG. 6 illustrates a direct current driver circuit that includes a switched capacitor network to manage voltage levels.

FIG. 6 shows a particular implementation of a direct current driver circuit using this approach that is particularly simple. The direct current driver circuit of FIG. 6 will be used to illustrate operation of the direct current driver circuit.

In the direct current driver circuit of FIG. 6, Vmod should be kept between one third (⅓) and two-thirds (⅔) of Vin for good modulation. So, a voltage of one third (⅓) Vin is maintained on capacitor C by some of the techniques previously described. If Vstr is between zero (0) and one third (⅓) of Vin then transistors 686 and 685 are turned on such that Vmod=(⅓Vin)+Vstr thereby keeping Vmod in the proper voltage range. If Vstr is between one third (⅓) and two-thirds (⅔) Vin then transistors 685 and 687 are turned on to keep Vmod=Vstr and in the proper voltage range. If Vstr is between two-thirds (⅔) Vin and Vin then transistors 684 and 687 are turned on such that Vmod=Vstr−(⅓Vin) keeping it in the proper voltage range. Thus, the switched capacitor network 620 keeps Vmod in the designated range of between one third (⅓) and two-thirds (⅔) of Vin.

The direct current driver circuit of FIG. 6 has the advantage of requiring only a single supply, while allowing the voltage on the load to vary between near 0 and near the supply voltage. This reduces the capacitance losses (the $CV^2$ losses) by more than a factor of 9 compared to the normal standard direct current driver circuit. Furthermore, the direct current driver circuit of FIG. 6 does not require a catch supply or circuity.

Note also that this direct current driver circuit design, like the standard direct current driver circuit version, can be used to drive both ends of the series connected loads to double the load voltage with only a doubling of power loss.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A driver circuit for driving a single conductor line that is coupled to a series of individually controlled circuit units, each of the individually controlled circuit units in the series including a capacitor, the driver circuit comprising:
   a power supply circuit for supplying a constant current to the single conductor line, the power supply circuit coupled to a power input voltage; and
   a line driver supply circuit configured to modulate a digital information signal onto the constant current on the single conductor line, the line driver circuit including:
      a first signaling transistor coupled to a signal input voltage that is two times the power input voltage, and structured to operate in a zero voltage switched mode at least part of a time period;
      a second signaling transistor coupled in series to the first signaling transistor and powered with a voltage that equals the power input voltage; and
      a signaling inductor coupled between the single conductor line and a node located between the first signaling transistor and the second signaling transistor.

2. The driver circuit according to claim 1, in which the power supply comprises:
   a transistor coupled between a supply voltage and a reference voltage; and
   a power inductor coupled between the transistor and the single conductor line.

3. The driver circuit according to claim 1, in which:
   the first signaling transistor and the second signaling transistor have a higher resistance and a lower capacitance than a power transistor in the power supply circuit.

4. The driver circuit according to claim 1, in which the line driver circuit further comprises a switched capacitor network coupled between the single conductor line and the signaling inductor.

5. The driver circuit according to claim 4, in which the switched capacitor network is charged from the power supply circuit.

6. The direct current driver circuit of claim 1, in which the single conductor line includes a first end and a second end, and in which the line driver circuit is configured to simultaneously drive both the first end of the single conductor line and the second end of the single conductor line.

7. The direct current driver circuit of claim 6, in which the line driver circuit is configured to drive the first end of the single conductor line with a voltage in a first direction, and in which the line driver circuit is configured to drive the second end of the single conductor line with a voltage in a second direction, the second direction opposite the first direction.

8. A driver circuit for driving a single conductor line that is coupled to a series of individually controlled circuit units, each of the individually controlled circuit units in the series including a capacitor, the driver circuit comprising:
   a power supply circuit for supplying a constant current to the single conductor line; and
   a line driver supply circuit configured to modulate a digital information signal onto the constant current on the single conductor line, the line driver circuit including:
     a signaling transistor structured to operate in a zero voltage switched mode at least part of a time period,
     a signaling inductor coupled between the single conductor line and the signaling transistor, and
     a switched capacitor network coupled between the single conductor line and the signaling inductor;
   in which, prior to a bit of the digital information signal being modulated onto the constant current on the single conductor line, the switched capacitor network is driven to offset a modulation voltage from an instant voltage of the single conductor line.

9. A driver circuit for driving a single conductor line that is coupled to a series of individually controlled circuit units, each of the individually controlled circuit units in the series including a capacitor, the driver circuit comprising:
   a power supply circuit for supplying a constant current to the single conductor line; and
   a line driver supply circuit configured to modulate a digital information signal onto the constant current on the single conductor line, the line driver circuit including:
     a signaling transistor structured to operate in a zero voltage switched mode at least part of a time period,
     a signaling inductor coupled between the single conductor line and the signaling transistor, and
     a switched capacitor network coupled between the single conductor line and the signaling inductor including:
       a first pair of opposing transistors connected to the single conductor line,
       a second pair of opposing transistors connected to the electrical signaling inductor, and
       a capacitor connected between the first and second pairs of opposing transistors.

10. A driver circuit for driving a single conductor line that is coupled to a series of individually controlled circuit units, each of the individually controlled circuit units in the series including a capacitor, the driver circuit comprising:
   a power supply circuit for supplying a constant current to the single conductor line; and
   a line driver supply circuit configured to modulate a digital information signal onto the constant current on the single conductor line, the line driver circuit including:
     a signaling transistor structured to operate in a zero voltage switched mode at least part of a time period,
     a signaling inductor coupled between the single conductor line and the signaling transistor, and
     a switched capacitor network coupled between the single conductor line and the signaling inductor including:
       a pair of opposing transistors connected between the single conductor line and the electrical signaling inductor, and
       a capacitor connected between one of the transistors and the electrical signaling inductor.

11. A driver circuit for driving a single conductor line that is coupled to a series of individually controlled circuit units, each of the individually controlled circuit units in the series including a capacitor, the driver circuit comprising:
   a power supply circuit for supplying a constant current to the single conductor line; and
   a line driver supply circuit configured to modulate a digital information signal onto the constant current on the single conductor line, the line driver circuit including:
     a signaling transistor structured to operate in a zero voltage switched mode at least part of a time period,
     a signaling inductor coupled between the single conductor line and the signaling transistor, and
     a switched capacitor network coupled between the single conductor line and the signaling inductor including:
       at least two transistors connected in parallel with each other between the single conductor line and the electrical signaling inductor, and
       at least one capacitor between each transistor and an adjacent transistor.

\* \* \* \* \*